(12) United States Patent
Krug

(10) Patent No.: US 7,514,812 B2
(45) Date of Patent: Apr. 7, 2009

(54) POWER SUPPLY CIRCUIT IN ADDITION TO COMMUNICATIONS EQUIPMENT COMPRISING A POWER SUPPLY CIRCUIT

(75) Inventor: Wilfried Krug, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 267 days.

(21) Appl. No.: 10/542,446

(22) PCT Filed: Nov. 26, 2003

(86) PCT No.: PCT/DE03/03913

§ 371 (c)(1),
(2), (4) Date: Jul. 14, 2005

(87) PCT Pub. No.: WO2004/068253

PCT Pub. Date: Aug. 12, 2004

(65) Prior Publication Data

US 2006/0050448 A1    Mar. 9, 2006

(30) Foreign Application Priority Data

Jan. 17, 2003   (DE) ................... 103 01 673

(51) Int. Cl.
H02J 1/10    (2006.01)
(52) U.S. Cl. .................. 307/28; 307/18; 307/31; 307/75; 307/82

(58) Field of Classification Search .......... 307/82, 307/28
See application file for complete search history.

(56) References Cited

U.S. PATENT DOCUMENTS

| 3,740,569 | A | | 6/1973 | Carcia ................... 307/11 |
| 5,555,151 | A | * | 9/1996 | Baker et al. ............ 361/79 |
| 6,064,262 | A | * | 5/2000 | Wang .................... 330/253 |
| 6,263,015 | B1 | * | 7/2001 | Awata et al. ........... 375/216 |
| 6,757,386 | B1 | * | 6/2004 | Latu et al. .............. 379/416 |
| 7,085,584 | B2 | * | 8/2006 | Shima .................. 455/550.1 |

FOREIGN PATENT DOCUMENTS

| DE | 100 49 994 A1 | 4/2002 |
| EP | 0 410 423 A2  | 1/1991 |
| EP | 0 545 042 A1  | 6/1993 |

* cited by examiner

Primary Examiner—Stephen W Jackson
Assistant Examiner—Hal I Kaplan

(57) ABSTRACT

The invention relates to a power supply circuit comprises several power supply modules for supplying power to various sub-assemblies and/or interfaces of electrical equipment, e.g. a communications equipment or a personal computer, in addition to a regulating circuit that regulates a first power supply module. The regulating circuit is connected to the power supply outputs of those power supply modules, between which a maximum voltage differential deviates from a reference value, the first power supply module is corrected in such a way that the deviation is minimized.

13 Claims, 1 Drawing Sheet

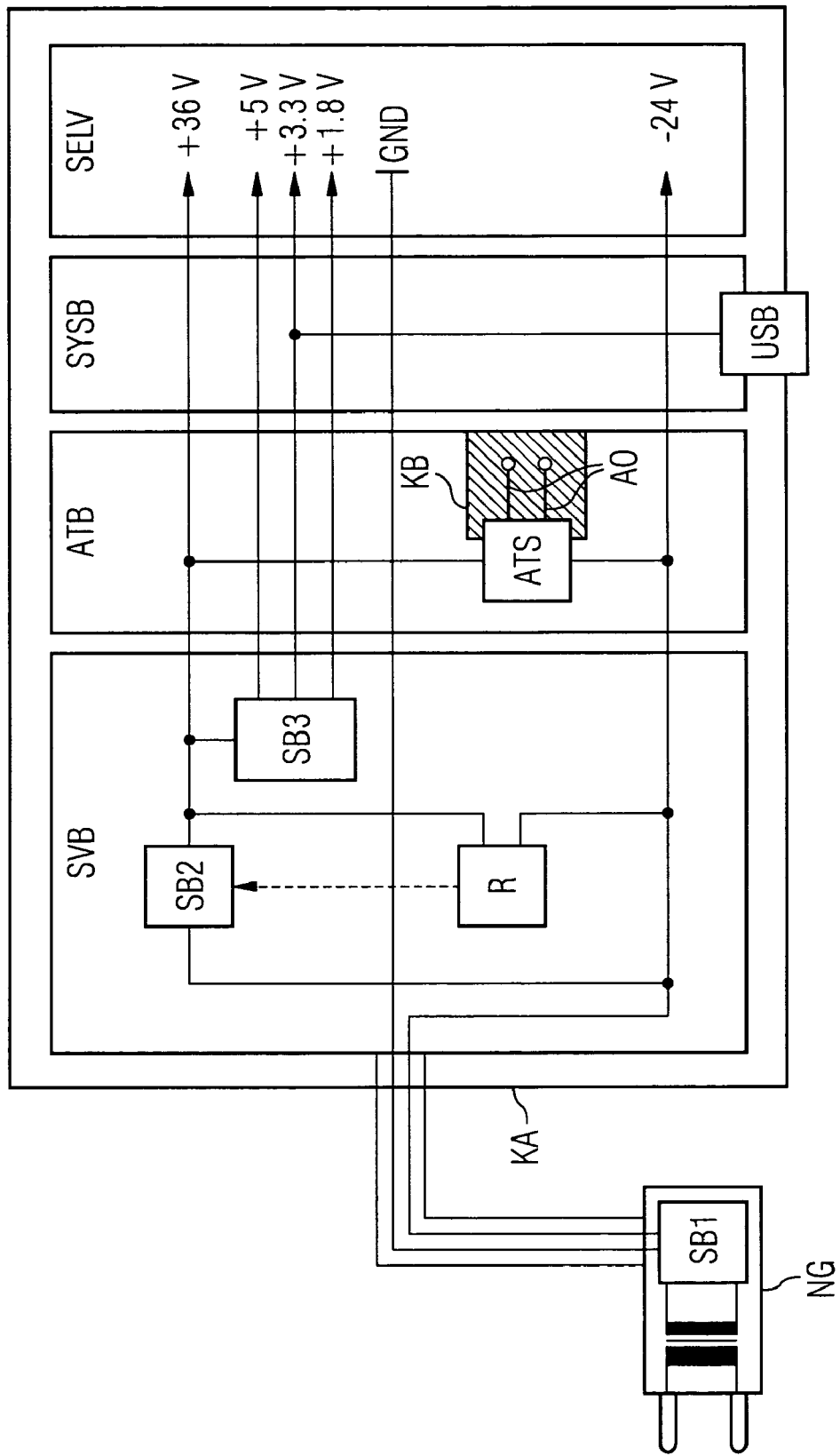

POWER SUPPLY CIRCUIT IN ADDITION TO COMMUNICATIONS EQUIPMENT COMPRISING A POWER SUPPLY CIRCUIT

CROSS REFERENCE TO RELATED APPLICATIONS

This application is the US National Stage of International Application No. PCT/DE2003/003913, filed Nov. 26, 2003 and claims the benefit thereof. The International Application claims the benefits of German application No. 10301673.2, filed Jan. 17, 2003, both applications are incorporated by reference herein in their entirety.

FIELD OF INVENTION

The invention relates to a power supply circuit for an electric system, an electric system comprising a power supply circuit and a method for operating the power supply circuit.

SUMMARY OF THE INVENTION

Electric systems such as, for instance, communication systems or personal computers frequently have a plurality of modules and/or interfaces needing different supply voltages. Supply voltages of, for example, −24V, +36V, +5V, +3.3V, and +1.8V are needed in a typical communication system.

For product safety reasons, voltages applied to external interfaces such as, for example, USB (Universal Serial Bus), V. 24, or Ethernet must not exceed a maximum voltage established by what is termed the SELV (Safety Extra Low Voltage) standard. The SELV standard is defined in the IEC 60950 standard of the International Electrotechnical Commission and, for direct current, stipulates a maximum permissible voltage of 60V. Direct voltages above 60V are classified as hazardous voltages.

Many communication systems contain modules, for example analog subscriber interfaces, whose supply voltage is within the extreme range of the voltages permissible according to the SELV standard. The maximum permissible voltage may be exceeded if in the event, say, of a fault, a voltage of another module or interface is added to a supply voltage of such type that is only just permissible. This problem can occur particularly in electric systems having a multiplicity of supply voltages and especially in communication systems having analog subscriber interfaces.

According to the prior art, adherence to the SELV standard can be ensured by means of what is termed basic insulation according to the IEC 60950 standard, whereby circuits having different operating voltages have to be mutually insulated in a relatively complex manner. A fault simulation method can alternatively or additionally be carried out by means of which adherence to the SELV standard is to be verified also in the case of a simple fault. While a basic insulation method is relatively component-intensive, the expenditure requirements of a fault simulation method depend largely on the size or complexity of the areas of circuitry in which hazardous voltages could potentially occur. The expenditure requirements for both a basic insulation and a fault simulation method will increase considerably especially if—as is often necessary—operating voltages for one module have to be routed over another's printed-circuit boards.

The object of the present invention is to disclose a power supply circuit for powering various modules and/or interfaces of an electric system, which circuit is less expenditure-intensive and at the same time ensures adherence to a specified maximum voltage at all interfaces. The object of the invention is furthermore to disclose a communication system having a power supply circuit of said type.

Said object is achieved by the claims.

The power supply circuit according to the invention has a plurality of power supply components for powering different modules and/ar interfaces of an electric system, for example a communication system or personal computer, and a regulating circuit for regulating a first of the power supply components. An interface can here be, for example, a USB, V.24, or Ethernet interface as well as an analog subscriber interface or SELV power supply interface. Said regulating circuit is connected to different power supply components' power supply outputs between which a maximum voltage differential occurs during operation. Said regulating circuit is set up in such a way that if the maximum voltage differential exceeds a reference value the first power supply component will be adjusted such that the deviation will be reduced.

The output voltages of all the other power supply outputs of the power supply components are, in the nature of things, within the voltage range of the power supply outputs between which the maximum voltage differential occurs during operation. By regulating the maximum voltage differential it can thus generally be guaranteed that no greater voltage differentials will occur in any of the power supply components' supply range even in the event of a fault, for example a short-circuit. Constituting the only exception thereto, to be considered separately, is any circuit area in which a further voltage through which the maximum voltage differential could be exceeded is generated from a supply voltage by a voltage transformer. An instance of voltage generation of said type is the generation of a ringing signal at an analog subscriber interface. Critical circuit areas of this type that are to be considered separately are, however, as a rule relatively small and usually already adequately insulated from all other circuit areas. To protect the electric system as a whole it usually suffices to apply a fault simulation method to the critical circuit area only; this is considerably less expenditure-intensive than applying a fault simulation method to the electric system's entire area.

Using a power supply circuit according to the invention will enable modules and interfaces requiring to be supplied with different supply voltages to be spatially freely configured within the electric system. Printed conductors or leads for module powering can in particular be routed via other modules without perforce increasing the expenditure requirements for protecting the interfaces from hazardous voltages. This will provide substantially more freedom of design in terms of the spatial arrangement of the modules and interfaces.

According to an advantageous embodiment of the invention the regulating circuit can be set up in such a way that the maximum voltage differential will in the main not exceed a specified maximum voltage in keeping with, for example, what is termed the SELV (Safety Extra Low Voltage) standard.

An emergency shutdown device can furthermore be provided for shutting down the power supply if the maximum voltage specified according to, for example, the SELV standard is exceeded by the maximum voltage differential.

An exemplary embodiment of the invention is explained in more detail below with reference to the FIGURE.

BRIEF DESCRIPTION OF THE DRAWING

The sole FIGURE is a schematic of a communication system with a power supply circuit having a plurality of power supply components.

DETAILED DESCRIPTION OF THE INVENTION

The FIGURE is a schematic of a communication system KA, for example a private automatic branch exchange, which is supplied with current via a plug-in power supply unit NG. In the present exemplary embodiment said plug-in power supply unit NG has a power supply component SB1 having an output voltage of −24V. Said power supply component SB1 is connected to a power supply module SVB of the communication system KA via a ground lead GND and a −24V power supply lead.

The power supply module SVB contains as power supply components d.c.-to-d.c. converters SB2 and SB3. The d.c.-to-d.c. converter SB2 is connected to the −24V power supply lead and generates an output voltage of +36V from −24V input voltage. A +36V power supply lead is fed by the d.c.-to-d.c. converter SB2. The power supply module SVB has as a further power supply component a d.c.-to-d.c. converter SB3 which is connected to the 36V power supply lead and which generates output voltages of +5V, +3.3V, and +1.8V from the input voltage of +36V. The power supply outputs of the d.c.-to-d.c. converter SB3 feed corresponding +5V, +3.3V, and +1.8V power supply lines. In the interests of greater clarity a respective ground connection of the d.c.-to-d.c. converters SB2 and SB3 is not shown in the FIGURE.

The power supply module SVB furthermore has a regulating circuit R connected to the power supply outputs of the power supply components SB1, SB2, and SB3 between which outputs the greatest voltage differential of the power supply module SVB occurs during operation. That means to say that the regulating circuit R is connected to the highest supply voltage, in this case the positive +36V voltage, and to the lowest supply voltage, in this case the negative −24V voltage. The voltage differential is derived for the regulating circuit R directly from or at least as close as possible to the respective power supply outputs of the relevant power supply components, in this case SB1 and SB2. What is aimed to be achieved thereby is that no substantial voltage drop adversely affecting a regulation operation will occur between the respective power supply output and regulating-circuit input even in the event of a fault.

A manipulated-variable output of the regulating circuit R is—as indicated by a dashed arrow—connected to the power supply component SB2 in order to control or, as the case may be, adjust its output voltage as a function of the voltage differential routed to the regulating circuit R. In the present exemplary embodiment the output voltage of the power supply component SB2 is adjusted by the regulating circuit R in such a way that the maximum voltage differential occurring in the power supply module SVB, which is to say the difference between the output voltages of SB1 and SB2, will be as close as possible to its nominal rating of 36V−(−24V)=60V but will in the main not exceed this, with exceeding of the nominal voltage of 60V here being prevented by means of counter-controlling. The nominal voltage of 60V being a maximum voltage specified by the SELV standard, it is in this way possible to ensure adherence to the SELV standard.

Compared to separate regulating of the individual output voltages of the power supply components SB1 and SB2, regulating according to the invention is advantageous to the extent that instead of two controlled variables there is only one such variable to be regulated, namely the maximum voltage differential that is important in view of the SELV standard. Using the maximum voltage differential as the only controlled variable moreover allows a regulating tolerance that is greater than in the case of separate regulating of the individual output voltages because errors during separate regulating are generally mutually aggregated. This applies particularly to cases where the supply voltages are prone to relatively large voltage variations such as, for example, in the case of plug-in power supply units. The expenditure requirements for the regulating circuit can be reduced as a result of the greater regulating tolerance.

In the present exemplary embodiment only the power supply component SB2 is adjusted by the regulating circuit R as a function of the maximum voltage differential. However, according to a variant embodiment one or several further power supply component(s), in this case SB1 and/or SB3, could also be regulated as a function of the maximum voltage differential. To increase the level of regulating accuracy, preferably the power supply component having the largest amount of output voltage, in this case SB2 with an output voltage of 36V, should be adjusted by the regulating circuit R.

A subscriber module ATB having an analog subscriber interface ATS, a system module SYSB having a USB interface USB, and an internal power supply interface SELV meeting the SELV standard are powered by the power supply module SVB. Further modules and/or interfaces (not shown) of the communication system KA can also be powered by being connected to the internal power supply interface SELV.

The power supply lines for +36V, +5V, +3.3V, +1.8V, and −24V as well as the ground lead GND are routed from the power supply module SVB to the power supply interface SELV via the subscriber module ATB and the system module SYSB, and depending on whether or not a respective supply voltage is needed by the relevant module ATB or, as the case may be, SYSB. In the present exemplary embodiment only the +3.3V supply voltage is needed in the system module SYSB for powering the USB interface USB. In the subscriber module ATB, by contrast, the −24V supply voltage and the +36V supply voltage are routed to the analog subscriber interface ATS. The analog subscriber interface ATS is therefore operated with a supply voltage differential of 60V, which is in the extreme range of the voltages permissible according to the SELV standard.

The analog subscriber interface ATS serves to connect analog terminals such as, for example, analog telephones, fax machines, answering machines, and analog modems. By means of an internal voltage transformer (not shown) it generates a high supply voltage, as a rule outside the range permissible according to the SELV standard, as a ringing signal. The higher the ringing-signal voltage is, the longer can be a respective lead via which an analog terminal can additionally be driven. As the ringing-signal voltage is derived from the supply voltage differential of the analog subscriber interface ATS, said supply voltage differential should be as large as possible so that terminal leads can be of maximum possible length. Through the power supply circuit according to the invention the analog subscriber interface ATS can, on the one hand, be supplied with a very large supply voltage differential of 60V, or close to 60V, which however, on the other hand, will in the main not exceed the maximum voltage permissible according to the SELV standard.

Regulating the maximum supply voltage differential will also allow high supply voltages in the extreme range of the SELV voltages to be transported through the entire communication system and via any modules while adhering to the SELV standard. Owing to regulating to a maximum of 60V between the highest and lowest supply voltage, the modules and interfaces powered by the power supply module SVB, which in this case are ATB, SYSB, USB, and SELV, will be within the voltage range permissible according to the SELV standard. A critical circuit area KB around analog outputs AO of the analog subscriber interface ATS is to be considered as the only circuit area in which voltages outside the voltage range permissible according to the SELV standard can occur. The ringing signal exceeding the SELV maximum voltage is fed out to connected analog terminals at the analog outputs AO. The critical circuit area KB is highlighted in the FIGURE by hatching. Since hazardous voltages in terms of the SELV standard can in the present exemplary embodiment only occur in the critical area KB around the analog outputs AO, the application of fault simulation and/or basic insulation is required only for said critical circuit area KB for ensuring adherence to the SELV standard. The area to be checked through fault simulation is thus substantially limited, as a result of which the number of test cases to be considered and hence the design risk will be less. All other circuit areas, modules, and interfaces of the communication system will be spatially freely configurable with adherence to the SELV standard being ensured.

The invention claimed is:

1. A communication system, comprising:
   a plurality of communications circuit modules each operable at one or more of a plurality of voltages, at least one of the modules being compliant with a maximum permissible voltage level defined for normal operation of the module;
   a plurality of power supply components for simultaneously supplying the circuit modules with multiple voltage levels; and
   a regulating circuit connected to control output of at least a first of the power supply components with respect to the maximum permissible voltage level during operation of the communication system, wherein the regulating circuit is adapted so that when a deviation beyond the maximum permissible voltage level, from a reference voltage value, occurs, voltage output from the first power supply component is adjusted to reduce the deviation.

2. The system according to claim 1, wherein the modules include one or more interfaces taken from the group consisting of USB, V.24 and Ethernet interfaces.

3. The system according to claim 1, wherein the maximum permissible voltage level is a specified maximum voltage value.

4. The power supply circuit according to claim 1, wherein the first power supply component provides a power supply output having a maximum output voltage among all of the power supply components.

5. The power supply circuit according to claim 1, wherein the regulating circuit regulates at least one further of the power supply components and the regulating circuit is adapted that in case of deviation beyond the maximum permissible voltage differential output of the one further power supply component will be adjusted.

6. A communication system, comprising:
   a plurality of communications circuit modules each operable at one or more of a plurality of voltages, at least one of the modules being compliant with a maximum permissible voltage differential according to the Safety Extra Low Voltage (SELV) standard as defined in the IEC 60950 standard of the International Electrotechnical Commission; and
   a power supply circuit having a plurality of power supply components for supplying the modules with a plurality of differing voltage levels; and
   a regulating circuit for regulating voltage output from a first of the power supply components relative to the SELV standard, wherein
   the regulating circuit is connected between outputs of power supply components between which the maximum voltage differential occurs during normal operation of the system, and wherein
   the regulating circuit is adapted so that, in case of deviation beyond the maximum permissible voltage differential from a reference voltage value, output from the first power supply component will be adjusted to reduce the deviation.

7. The system according to claim 6, wherein the circuit modules include communications interfaces.

8. The system according to claim 7, wherein one of the interfaces is an analog subscriber line.

9. The system according to claim 7, wherein the power supply circuit includes a plurality of dc to dc converters.

10. The system according to claim 7, wherein one of the modules provides a USB interface and the SELV standard compliant module receives multiple voltage levels from the power supply module.

11. The system according to claim 7, wherein one of the modules is a subscriber module.

12. The system according to claim 7, wherein one of the modules is a system module.

13. A method for operating a power supply circuit in a communication system, wherein the power supply circuit comprises:
    a plurality of power supply components for simultaneously supplying circuit modules of the communication system with multiple DC voltage levels; and
    a regulating circuit for regulating a first of the power supply components, the regulating circuit connected to outputs of at least the first power supply component and one of the other power supply components between which a maximum voltage differential occurs during normal operation of the communication system, the regulating circuit adapted to reduce or eliminate deviation of the maximum voltage differential beyond a reference voltage value, the method comprising:
    comparing the maximum voltage differential with the reference voltage value and
    adjusting voltage output from one of the power supply components when the maximum voltage differential exceeds the reference voltage value such that the deviation will be reduced.

* * * * *